ELECTRONIC COMPONENT

Filed April 5, 1968 2 Sheets-Sheet 1

INVENTORS.
HAROLD D. EDMONDS
GILBERT GOODMAN
WILLIAM J. MC WILLIAMS
BY: Arnold Graf
ATTORNEY.

ELECTRONIC COMPONENT

Filed April 5, 1968 2 Sheets-Sheet 2

INVENTORS.
HAROLD D. EDMONDS
GILBERT GOODMAN
WILLIAM J. MC WILLIAMS
BY: Arnold Grant
ATTORNEY.

United States Patent Office 3,517,271

Patented June 23, 1970

3,517,271

ELECTRONIC COMPONENT

Harold D. Edmonds, Yorktown Heights, N.Y., Gilbert Goodman, Bayside, Wis., and William J. McWilliams, New Fairfield, Conn., assignors to Vitramon, Incorporated, Monroe, Conn., a corporation of Delaware.

Continuation-in-part of application Ser. No. 656,747, July 28, 1967. This application Apr. 5, 1968, Ser. No. 719,106

Int. Cl. H01f *3/10*

U.S. Cl. 317—101 16 Claims

ABSTRACT OF THE DISCLOSURE

The present invention relates to an electronic component which primarily exhibits inductive reactance. More particularly, the present invention relates to an electronic component comprising a monolithic body having at least two generally planar sections of magnetic material surrounding at least one generally planar section of conductive material.

This application is a continuation-in-part of copending application, Ser. No. 656,747, filed July 28, 1967.

Most presently available inductive components contain substantial quantities of organic materials; usually in the form of plastics and usually as insulation for the windings, or as a casing for the component, or as potting material to fill the voids, either in the component or between the component and the inner walls of the casing. The presence of organic constituents has little effect on the performance of the component under normal operating circumstances. However, if the temperature should rise above 2–300° F., or if the humidity is at a relatively high level for a sustained period, or if physical conditions are suitable for bacterial life to generate a mold, the presence of organic constituents can have deleterious effects on the performance of the component. In addition, the presence of organic constituents has a significant effect on the method of manufacture that can be used and the short term power overload that the component can withstand before it fails.

A typical transformer cross-section has a core of high permeability material, a series of windings wrapped around the core, an insulating layer of organic material surrounding the windings, a metal sheath overlying the insulation, and one or more protective coats of plastic jacketing the metal sheath. Thus, the choice of methods for wrapping the metal sheath around the core and windings and applying the protective plastic jacket are inherently limited by the melting temperature of the material chosen as the insulation for the windings, i.e., the methods used must not raise the temperature of the work piece above 2–300° F. or the insulation will melt. Similarly, if the heat generated by the excessive power should raise the temperature into or above 2–300° F. range the insulation and/or the plastic jacket will melt and the component will fail.

It is therefore the primary object of the present invention to overcome the above disadvantages by providing a novel electronic component formed by fusing together alternating layers of at least two inorganic materials. As is well known, inorganic materials are not, as a general rule, subject to attack by biological life, by excessive humidity or by temperatures below 750° F. The present invention is primarily directed to an inductor produced by alternating layers of a naturally occurring or synthetically derived ferrite with layers of a conductive material, having a greater conductivity than ferrite, and then firing the composite to fuse the individual layers into a unitary or monolithic structure. Ferrite is ideally suited as the material for the magnetic layers because it functions as an insulator as well as being magnetic so that no additional insulation is necessary either for the conductive layers or for the component. There is a wide range of metals which may be used for the conductive layers; the basic choice criteria being that the metal or alloy selected must not chemically react with or affect the ferrite. A partial list of possible choices would be tungsten, tantalum, osmium, molybdenum, iridium, ruthenium, rhodium, chromium, platinum, palladium, cobalt, nickel, beryllium, gold, silver, and copper, etc.

Through experimentation applicants have found that a generally linear, closed configuration such as a circle or a rectangle is the preferred shape for the conductive layers. They have also found that a substantial portion of the core, i.e. the area within the boundaries of the conductive material, can be removed without noticeably affecting the inductive characteristics of the component. Still further, they have found that the core can be utilized to make a multielement circuit component. Thus, by either inserting a second electrical component in the core, or by forming the second component in the core section, as an integral part of the device, during the initial preparation of the device, the inductance can be combined with another passive or active device to form a multielement circuit component.

It is therefore another object of the present invention to provide a multielement circuit component comprising a fused unitary body member having layers of a low conductivity magnetic material alternating with layers of high conductivity material, the layers of high conductivity material having a generally linear closed configuration and at least a major portion thereof embedded in the body member between the layers of low conductivity magnetic material to form with the low conductivity magnetic material a first electronic component having primarily inductive reactance; and, at least one other electronic component having at least a major portion thereof within the boundaries defined by the generally linear, closed configuration of the high conductivity layers.

If the component is to be used as an inductor the individual conductive layers are in electrical communication with each other and with two leads, one at each end of the conductive layers circuit, for interconnection of the conductive layers with external circuitry. Applicants, additionally, have found that selective electrical communication between certain conductive layers and a voltage source, interconnecting the remaining conductive layers to a work load, will cause the component to function as a transformer. That is, it will impress a voltage in the remaining conductive layers and cause a current to flow through the workload circuit. They have also found that the electrical component of the present invention can function as an autotransformer by appropriate secondary lead connections to selected portions of the conductive layer circuit, to be described in greater detail below.

It is therefore still another object of the present invention to provide an electronic component comprising a monolithic body having sections of a low conductivity magnetic material alternating with sections of a high conductivity material having at least a major portion thereof embedded in the monolithic body between the low conductivity magnetic material sections, selected sections of the high conductivity material being in electrical communication with each other, at least one of the selected section of high conductivity material having means for electrical connection of the component with a first external circuit, the remaining sections of high conductivity material being in electrical communication with each other, at least one of the remaining sections of high conductivity material having means for electrical connection of the component with a second external circuit, the selected sections of high conductivity material and the remaining sections of high conductivity material being in such proximity that when the component is connected to the first and second external circuits a voltage across the first external circuit will impress a voltage across the remaining sections of high conductivity material thereby causing a current to flow in the second external circuit.

It is yet another object of the present invention to provide an electronic component comprising a monolithic body having at least two layers of a low conductivity magnetic material alternating with at least one layer of high conductivity material having at least a major portion thereof embedded in the monolithic body between the low conductivity material layers; first means in electrical communication with selected portions of the high conductivity material layers to connect the component to a first external circuit; and, second means in electrical communication with selected portions of the high conductivity material layers to connect the component to a second external circuit, such that a voltage across the first external circuit will impress a voltage across the second external circuit causing a current flow through the second external circuit.

The subject matter which applicants regard as their invention is particularly pointed out and distinctly claimed in the concluding portion of this specification. The invention, however, as to its organization and method of operation together with further objects and advantages thereof will best be understood by reference to the following description taken in conjunction with the accompanying drawings, in which:

Figures 1, 2, 3:
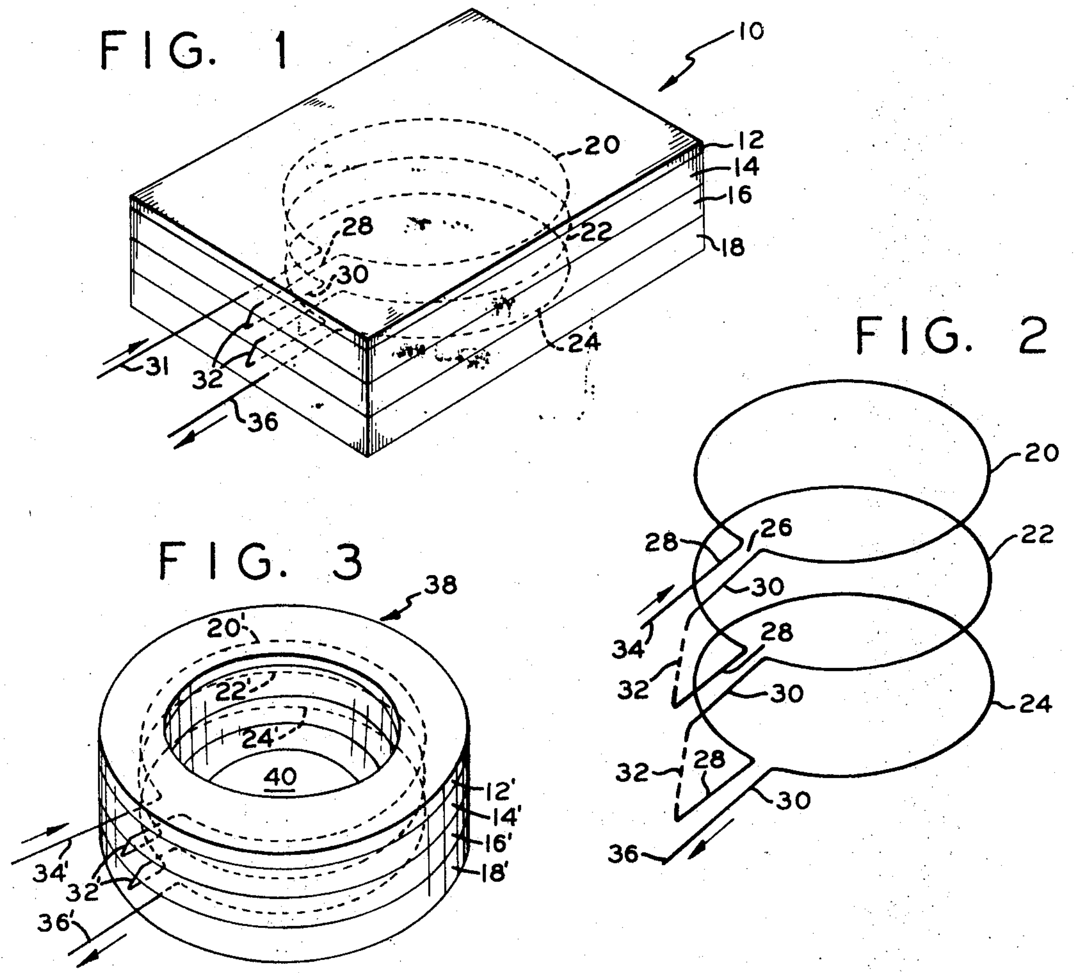
FIG. 1 is a perspective view of a first embodiment of the present invention.
FIG. 2 is a diagrammatic representation of the conductive layers and the electrical communication between the conductive layers and between the conductive layers and external circuitry for the first embodiment of the present invention.
FIG. 3 is a perspective view of a second embodiment of the present invention.

Referring now to FIGS. 1 and 2 an electronic component 10 is formed of a monolithic body having a plurality of magnetic material layers 12, 14, 16, 18 alternating with a plurality of conductive material layers 20, 22, 24. The magnetic material layers are preferably formed of a naturally occurring or synthetically derived ferrite because of the unique magnetic and insulatory properties exhibited by ferrite. This ambivalent quality of ferrites permits the conductive layers to be positioned in the magnetic layers without an intermediate insulating layer and the component to be made without an insulating jacket. The absence of insulating material is meritorious in that no organic materials are present in the component so that the deleterious effects of temperature, humidity and biological life on the operation of the component are minimized. In addition, the ferrite is stock resistant and its extreme melting temperature enables the component to withstand thermal or power overload. The conductive layers may be any inorganic conductant, metal or alloy which does not chemically react with or affect the ferrite. Among the possible choices are one or more metals or compounds comprised of metals chosen from the group: tungsten, tantalum, osmium, molybdenum, iridium, ruthenium, rhodium, chromium, platinum, palladium, cobalt, nickel, beryllium, gold, silver and copper. It should be understood at this point that the above list of conductive materials and the choice of magnetic material is by way of example only and that any inorganic conductant, metal or alloy or magnetic material which substantially fullfills the above choice criteria can be used. It should be equally understood that the number of layers of magnetic material and conductive material shown in each of the figures is for simplicity of drawings and thus also by way of example only; any number of layers being intended to fall within the scope of the invention.

The present invention may be formed by the method disclosed by Lee and Weller in U.S. Pat. No. 2,779,975. In this process individaul layers of powdered ferrite, in a liquid base, are alternated with layers of a conductive material paste. The composite is then cut into the individual components and fired into monolithic bodies. The concept of the monolithic body is essential to the present invention. It being understood that during the firing step of the process the magnetic and conductive materials fuse or sinter to form a unitary body wherein the individual layers are no longer mechanically separable.

Experimentation by applicants has shown that a generally linear, closed configuration such as, for example, a circle or a square is the most efficient shape for the conductive layers. It will be noted that, in the embodiments of FIG. 1, 2, 3, 4, 6 and 7, there is a gap 26 (see layer 20, FIG. 2) in the path of the conductive material and that a set of radial leads 28, 30 extends outwardly from each side of the gap in the conductive layer toward the surface of the monolithic body. An inspection of FIG. 1 will show that the size of the entire component, approximately 3 inch square, and the relative thicknesses of the conductive layer and the magnetic layer makes it extremely difficult to stack the conductive layers immediately above each other. That is, if viewed in plane, one conductive layer may be in front of or behind or to the side of its adjacent conductive layers. Applicants have found, however, that by radially orienting the leads 28, 30 the axial component of disorientation created by the relative positioning of adjacent conductive layers is obviated since adjacent leads will always remain in line with each other. Each of the leads 28, 30 pierces the surface of the monolithic body and a conductive linkage 32, overlying the surface of the body, joins the leads and, thus, electrically interconnects the conductive layers into a circuit. A set of external leads 34, 36, one at each end of the conductive layer and the magnetic layer makes it exductive layer circuit with an external circuit (not shown).

Looking now to FIG. 3 a second embodiment 38 of the present invention will be described in detail. In their experiments to determine optimum conductive layer configuration, applicants found that much of the core of the component, i.e., the area within the boundaries of the generally circular or elliptical conductive layer, could be removed without noticeably affecting the inductive characteristics of the component. They further found that the component would perform equally as well whether it had a generally rectangular exterior or a generally cylindrical exterior. To this end the embodiment of FIG. 3 is similar to that of FIGS. 1 and 2 except that the exterior is generally cylindrical and the interior or core section 40 has been removed giving the component a generally donut apparance, albeit with a rectangular cross-section.

The current trend in electronics is to miniaturization and the combining of electronic functions into a single device. With this in mind applicants have found that they can utilize the core of the embodiment of FIG. 3 as a repository for additional passive and/or active electronic functions such as, for example, a capacitor and/or a resistor and/or a transistor, etc. This result can be obtained either by inserting the additional components (not shown) into the core section 40 after the present invention has been formed and fired and electrically interconnecting the functions together and/or to external circuitry, in a manner known in the art; or, by the embodiment of FIG. 4, presently to be described.

Figure 4:
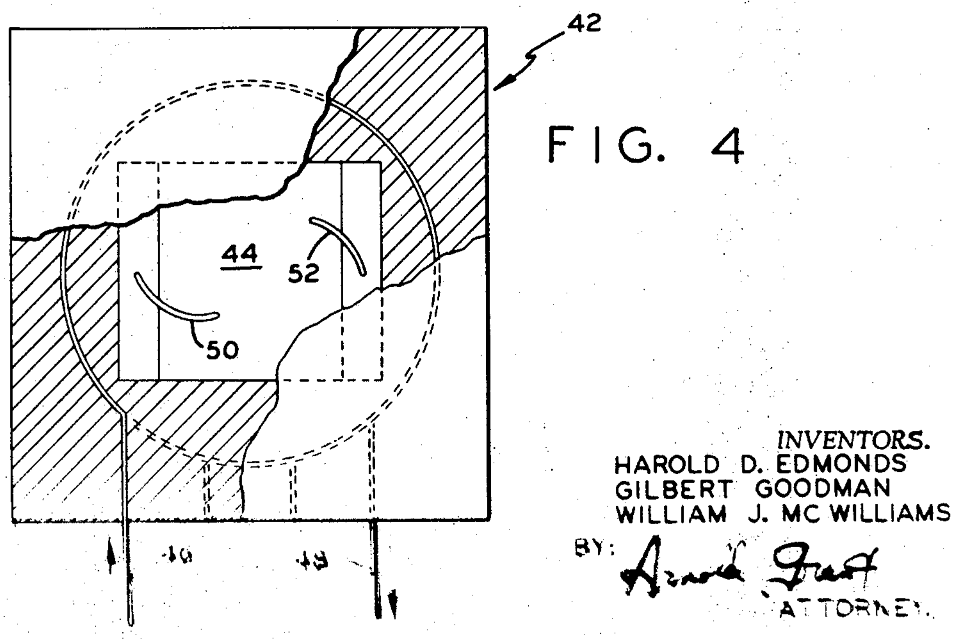
FIG. 4 is a plan view of a third embodiment of the present invention.

In the third embodiment 42 of the present invention, shown in FIG. 4, the individual components are integrally formed together during the initial preparation of the device, with the inductor portion 42 of the device substantially surrounding the other electrical functions 44. If, for example, the Lee-Weller process of U.S. Pat. No. 2,779,975 is to be used, the individual inductor layers could be deposited with a hollow core section. Simultaneously, the individual layers of the other component could then be deposited in the hollow core section until the build-up is completed. The composite can then be fired to fuse the layers and the components into a monolithic structure. As shown in FIG. 4, a first set of leads 46, 48 extends outwardly from the inductor portion and a second set of leads 50, 52 extends outwardly from the other component portion to provide interconnection and external circuitry connections for the multielement electronic component.

Figure 5:
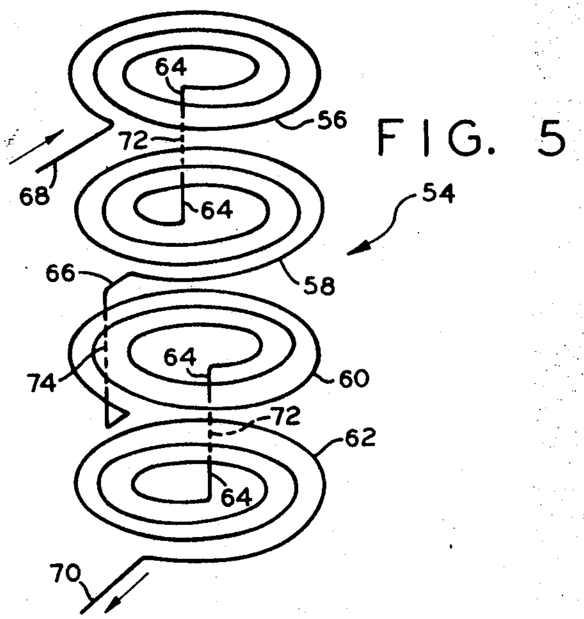
FIG. 5 is a diagrammatic representation of another conductive layer pattern which can be used with the embodiments of the present inveniton.

FIG. 5 diagramatically depicts another type of conductive layer pattern 54 which can be used with the embodiments of the present invention. As shown therein each conductive layer 56, 58, 60, 62 comprises a multicoil spiral, a set of internal leads 64, 66 and a set of connecting leads 68, 70. In order to preserve the unitary direction of current flow, during any one current cycle, it is necessary to connect layers 56, 58 and 60, 62 through the innermost coil of the spiral. To this end, if the embodiment of FIG. 3 is to be produced the internal leads 64 extend to and pierce the inner surface of the cylinder and a conductive linkage 72 similar to that shown at 32 in FIG. 1 electrically interconnects the adjacent leads and, thus, the adjacent conductive material layers. If, however, the embodiment of FIG. 1 is contemplated then linkage 72 must pierce the intermediate magnetic material layer to electrically join the conductive layers. The electrical connection of conductive layers 58, 60 is made through leads 66 which pierce the outer surface of the monolithic body and conductive linkage 74, which joins the leads in the manner described above.

Since the magnetic material layers are extremely thin, on the order of 1 to 10 mils, the conductive material layers are in very close proximity to each other. Thus, the total inductance of the component is significantly increased by the mutual inductance generated between the conductive layers. Applicants have found that for a relatively wide range of magnetic material layer thicknesses the effective inductance increases as the layer thickness decreased. They have further found that this mutual inductance can be harnessed and put to use by modifying the electrical interconnections between conductive layers and external circuitry and by using the modified component of the present invention as a transformer.

Figure 6:
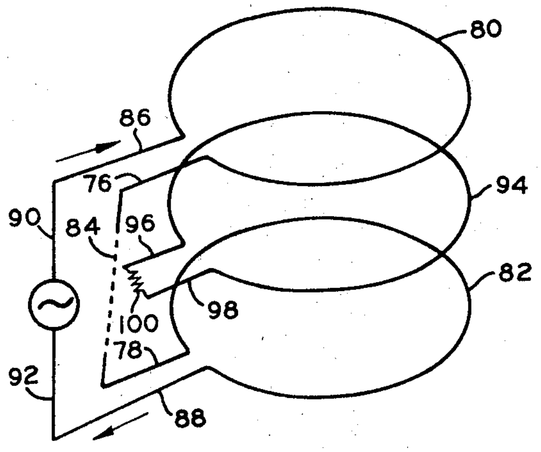
FIG. 6 is a diagrammatic representation of the conductive layer pattern and electrical interconnections of a fourth embodiment of the present invention; and, FIG. 7 is a diagrammatic representation of the conductive layer pattern and electrical interconnections of a fifth embodiment of the present invention.

Referring now to FIG. 6 a fourth embodiment of the present invention, which demonstrates this modification, will be described in detail. The referenced figure is a diagrammatic representation of a conductive layer interconnection pattern, it being understood that this pattern can be utilized in any form of inductive monolithic body. As shown in the drawing, internal leads 76, 78 extend outwardly from conductive layers 80, 82, respectively. The leads pierce the surface of the component body (not shown) and are electrically interconnected by a conductive linkage 84 to electrically interconnect conductive layers 80, 82, in the manner described above. Similarly, internal leads 86, 88 extend outwardly from conductive layers 80, 82 to join the layers to the leads 90, 92 of a first external circuit having a source of voltage. In a like manner, conductive layer 94, intermediate conductive layers 80, 82, has a set of internal leads 96, 98 which extend outwardly to join the conductive layer 94 to the leads of a second external circuit having a work load 100. Thus, when the source is activated and a voltage is impressed across the first external circuit, causing a current to flow through conductive layers 80, 82, the close proximity of conductive layers 80, 82 and 94 and the phenomenon of mutual inductance combine to impress a voltage onto the second external circuit, causing a current to flow from the conductive layer 94 to the work load.

Figure 7:
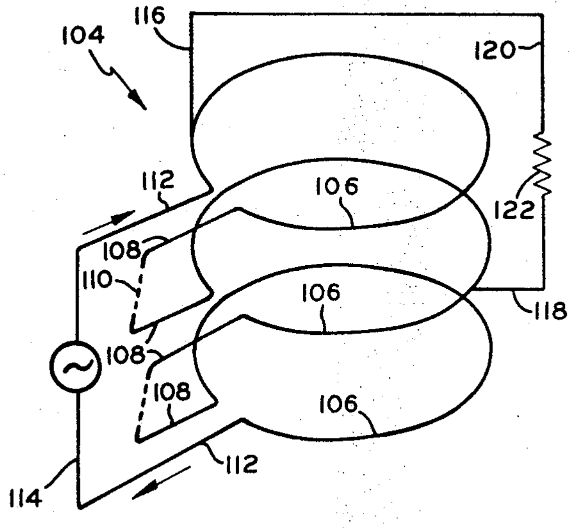

Looking now to FIG. 7 a modification of the above transformer and a fifth embodiment of the present invention will be described in detail. This embodiment shown generally by arrow 104 depicts what is known in the art as an autotransformer in that there is only one series of windings, i.e., conductive layers 106. A first set of internal leads 108 and a set of conductive linkages 110 electrically interconnect the conductive layers in the manner discussed above. A second set of internal leads 112 extends outwardly from the first and last conductive layers to join the conductive layer circuit with the leads 114 of a first external circuit having a source of voltage. A second set of leads 116, 118, lead 116 being preferably connected at an end of the conductive layer portion of the first external circuit, lead 118 being positioned at any selected point on the conductive layer portion of the conductive layer circuit, joins the leads 120 of a second external circuit having a work load 122. When a voltage is impressed across the first external circuit causing a current to flow through the conductive layers, the phenomenon of mutual inductance will cause a proportional voltage to be impressed across the second external circuit. The voltage, and correspondingly the current, of the second external circuit is, as well known in the art, dependent upon the voltage of the primary circuit and the relationship between the number of turns in the primary circuit and the position of lead 118 relative to the total number of turns in the primary circuit.

As this invention may be embodied in several forms without departing from the spirit or essential character thereof, the present embodiments are illustrative and not restrictive. The scope of the invention is defined by the appended claims rather than by the description preceding them, and all embodiments which fall within the meaning and equivalency of the claims are therefore intended to be embraced by those claims.

We claim:

1. An electronic component comprising a monolithic body having generally planar layers of a magnetic material alternating with at least one generally planar layer of a conductive material, each layer of conductive material having at least a major portion thereof embedded in said monolithic body between layers of magnetic material.

2. An electrical component as defined in claim 1 wherein each conductive layer is in electrical communication with each immediately adjacent conductive layer.

3. An electrical component as defined in claim 2 wherein each conductive layer has at least one conductive lead extending outwardly from the embedded portion thereof in a direction substantially parallel to the plane of said embedded portion to at least pierce the surface of said monolithic body; said component further comprising conductive means overlying selected portions of the pierced surface of said monolithic body to electrically join the surfaced portion of the leads of selected conductive layers and thereby electrically interconnect said selected conductive layers.

4. An electronic component as defined in claim 2 wherein each conductive layer has at least one conductive lead extending from said conductive layer in a direction substantially perpendicular to the plane of said conductive layer to electrically join at least one of the conductive leads of at least one of the adjacent conductive layers.

5. An electronic component as defined in claim 2 wherein the uppermost conductive layer and the lowermost conductive layer each have at least one conductive lead in electrical communication with an external circuit.

6. An electronic component as defined in claim 1 wherein the conductive layers have a generally linear closed configuration.

7. An electronic component as defined in claim 1 wherein at least the major portion of the magnetic layer material is a ferrite.

8. An electronic component as defined in claim 1 wherein the conductive layer is comprised of at least one metal chosen from the group: tungsten, tantalum, osmium, molybdenum, iridium, ruthenium, rhodium, chromium, platinum, palladium, cobalt, nickel, beryllium, gold, silver and copper.

9. An electronic component as defined in claim 8 wherein the magnetic material layer is comprised of at least 15% ferrite.

10. A multielement electronic component comprising a fused monolithic body member having an uppermost and a lowermost generally planar surface, layers of a magnetic insulating material alternating with at least one layer of a conductive material, the layers of conductive material having a generally linear closed configuration and at least a portion thereof embedded in the body member between the layers of magnetic insulating material to form with the magnetic insulating material a first electronic component; and, at least one other electronic component having at least a major portion thereof confined within the boundaries defined by the generally linear closed configuration of the conductive layers and the uppermost and lowermost planar surfaces of said monolithic body member.

11. A multielement electronic component as defined in claim 10 wherein the first electronic component has a portion of the volume defined by the generally linear closed configuration of conductive layers and the uppermost and lowermost planar surfaces of said monolithic body removed, said at least one other electronic component being inserted into the space defined by the removed volume and fixedly attached to said first electronic component.

12. A multielement electronic component as defined in claim 10 wherein said first electronic component and said at least one other electronic component are fused into a single monolithic body.

13. An electronic component comprising a monolithic body having at least two layers of a magnetic material alternating with at least one layer of a conductive material having at least a major portion thereof embedded in the monolithic body between the magnetic material layers; first means in electrical communication with first selected portions of the conductive material layers for connecting the component to a first external circuit; and second means in electrical communication with second selected portions of the conducitve material layers for connecting the component to a second external circuit such that when the component is connected to the first and second external circuits a voltage across the first external circuit will impress a voltage across the second external circuit causing a current to flow through the second external circuit.

14. An electronic component comprising a monolithic body having sections of a magnetic insulating material alternating with sections of a conductive material having at least a major portion thereof embedded in said monolithic body between the magnetic insulating material sections, selected sections of the conductive material being in electrical communication with each other, at least one of said selected sections of conductive material having means for electrical connection of the component with a first external circuit, the remaining sections of conductive material being in electrical communication with each other, at least one of said remaining sections of conductive material having means for electrical connection of the component with a second external circuit, the selected sections of conductive material and the remaining sections of conductive material being in such proximity in the monolithic body that when the component is connected to said first and second external circuits and a voltage is impressed across the first external circuit the current in the first external circuit will impress a voltage across the remaining sections of conductive material thereby causing a current to flow in the second external circuit.

15. An electronic device comprising a monolithic body having a plurality of substantially planar layers of a magnetic insulating alternating with a plurality of substantially planar layers of a conductive material having a generally circular configuration and at least a major portion thereof embedded in said monolithic body between the layers of magnetic insulating material, each layer of conductive material having at least one conductive material lead extending outwardly from the circumference thereof and at least piercing the surface of said monolithic body, and a conductive linkage overlying selected portions of the pierced surface of said monolithic body and electrically interconnecting the exposed leads of immediately adjacent conductive layers.

16. An electronic component as defined in claim 15 wherein at least the major portion of the magnetic insulating material is ferrite.

References Cited

UNITED STATES PATENTS

| | | | |
|---|---|---|---|
| 2,838,737 | 6/1958 | Duncan | 336—120 |
| 2,998,840 | 9/1961 | Davis | 154—2.6 |
| 3,260,972 | 7/1966 | Pusch | 333—84 |
| 3,287,670 | 11/1966 | Schroeder | 333—79 |

ROBERT K. SCHAEFER, Primary Examiner

J. R. SCOTT, Assistant Examiner

U.S. Cl. X.R.

333—70; 336—120